Sept. 1, 1925.
A. M. LUSBY
1,551,892
MANURE LOADER
Filed Aug. 18, 1923
3 Sheets-Sheet 1
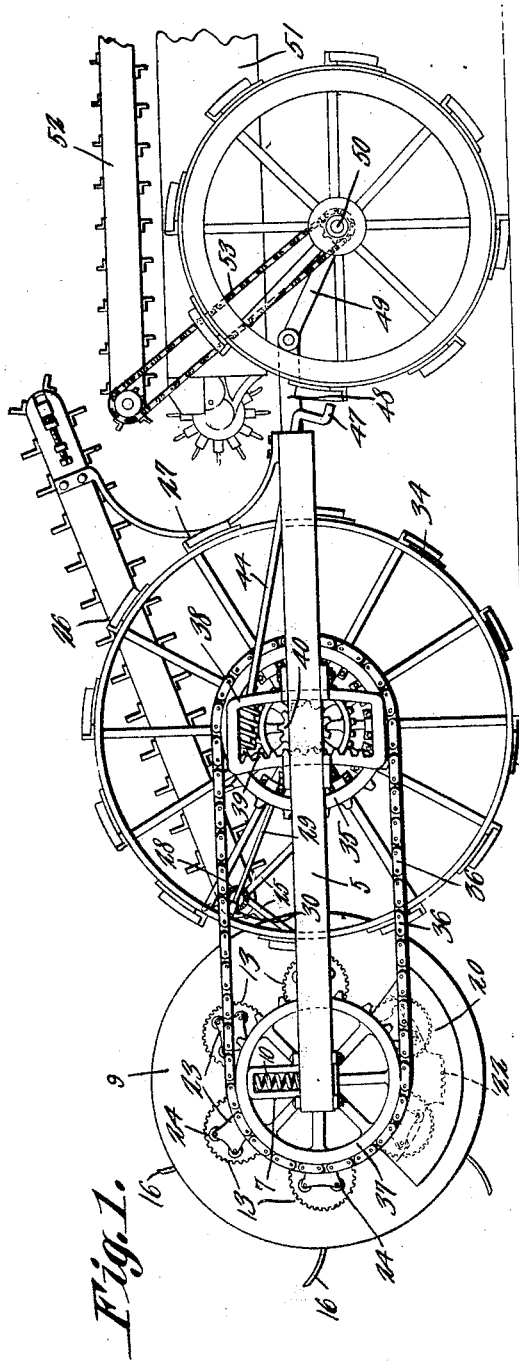
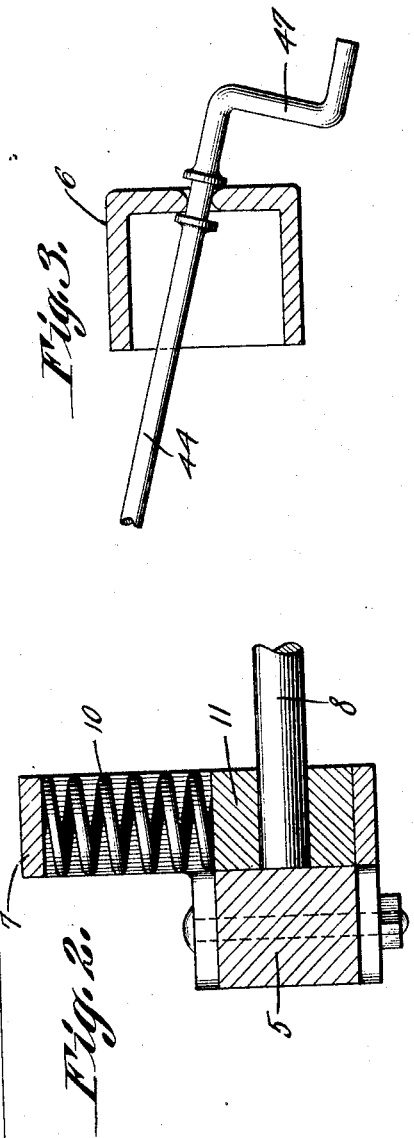
Inventor,
A. M. Lusby.
By C. A. Snow & Co.
Attorneys

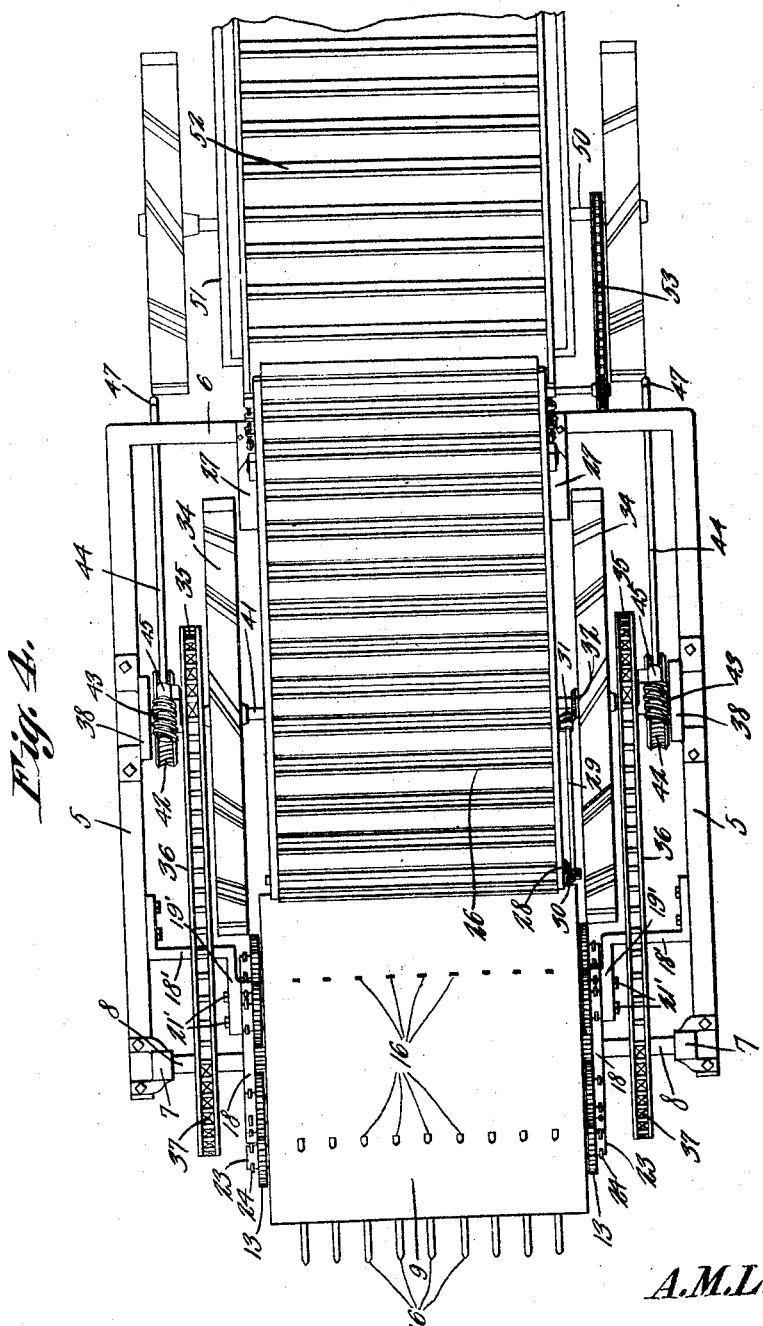

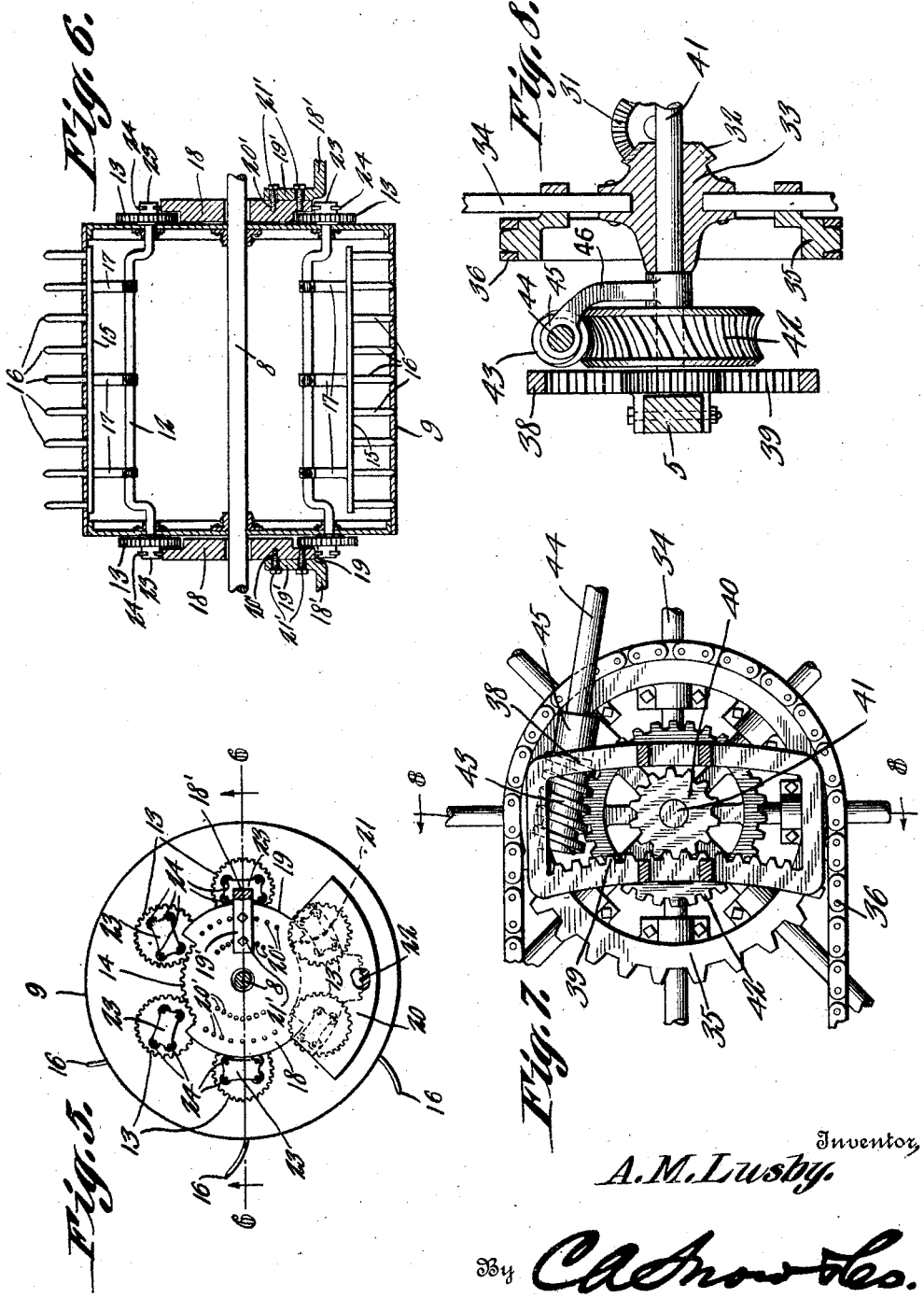

Patented Sept. 1, 1925.

1,551,892

UNITED STATES PATENT OFFICE.

ARTHUR M. LUSBY, OF KENNEDYVILLE, MARYLAND.

MANURE LOADER.

Application filed August 18, 1923. Serial No. 658,067.

*To all whom it may concern:*

Be it known that I, ARTHUR M. LUSBY, a citizen of the United States, residing at Kennedyville, in the county of Kent and State of Maryland, have invented a new and useful Manure Loader, of which the following is a specification.

This invention relates to agricultural machines, and more particularly to a machine especially designed for picking up manure scattered over a field and loading the same into a fertilizer distributing machine.

The primary object of the invention is to provide a device of this character which may be readily and easily hitched to the rear of a fertilizer distributing machine, whereby movement of the fertilizer distributing machine will result in a relative movement of the loading machine to accomplish the purpose of the invention.

Another object of the invention is to provide means for holding the loading prongs of the machine in their active positions for a predetermined period to insure against the fertilizer falling from the machine during the rotation of the loading drum.

A still further object of the invention is to provide means for adjusting the machine to adapt the device for use in connection with fertilizer distributing machines of various sizes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of the machine disclosing the same as supported at the rear of a fertilizer distributing machine.

Figure 2 is a fragmental sectional view disclosing the supporting bearing at one end of the loading drum.

Figure 3 is a fragmental sectional view disclosing one end of the adjusting rod and its supporting bearing.

Figure 4 is a plan view of the machine.

Figure 5 is an end elevational view of the loading drum.

Figure 6 is a transverse sectional view taken on line 6—6 of Figure 5.

Figure 7 is an end elevational view disclosing the adjusting means and

Figure 8 is a sectional view taken on line 8—8 of Figure 7.

Referring to the drawings in detail, the machine comprises a frame including the side bars 5 that are held in spaced relation at their forward ends by the bars 6, bearing supports 7 being supported at the rear of the frame to support the shaft 8 on which the loading drum 9 revolves.

These bearing supports are in the form of spaced bars extending upwardly between which are supported springs 10, bearings 11 being disposed between the bars and normally held to the limit of their downward movements by the coiled springs. As shown, the ends of the shaft 8 are positioned in the bearings 11 to revolve therein, the construction of the bearing supports being such as to permit of slight vertical movement of the drum 9 to compensate for irregularities in the surface over which the machine is moving.

Supported within the drum and extending through the end walls thereof are the crank shafts 12 on the outer ends of which are mounted gears 13 that are adapted to mesh with the segmental stationary gear 14 to rotate the crank arms predetermined distances. Associated with these crank shafts 12 are bars 15 that carry prongs 16 designed to move through openings in the wall of the drum 9 to pick up material and carry the same upwardly when the drum is rotated. Connecting rods 17 connect the bars 15 to the crank shafts 12 so that movement of the crank shafts 12 is imparted to the bars 15. The segmental gears are formed integral with the plate 18 and have curved edges 19 arranged in a plane around the outer edges of the teeth of the gears 14 for purposes to be hereinafter more fully described.

Forming a part of each plate is an extension 20 which depends therefrom and as shown, each extension is formed with a cut out portion indicated at 21 one wall thereof being offset at a point intermediate the ends of the plate and formed with the teeth 22 to be engaged by the teeth of the gears 13 to rotate the shafts associated with the gears.

Secured to the outer surface of each gear 14 is a locking plate 23 that carries rollers at its corners, the rollers being indicated at 24 to reduce friction between the plates and the plate 18 over which these plates 23 move during a portion of the rotation of the loading drum, as clearly shown by Figure 5 of the drawings, whereby the crank shafts 12 are held against movement, while in their active positions. The plates 18 are provided with a plurality of spaced openings 20' into which the bolts 21' extend, the bolts also passing through the right angled portions 19' of the arms 18' to adjustably support the plates 18 to vary the timing in the operation of the loading prongs. From the foregoing it will be seen that as the gears 14 move to the upper portion of the drum, the locking plates 23 are acting to hold the shafts 12 against movement to prevent the prongs 16 from being returned to points within the drum. As the gears reach the upper portion of the plate 18, the teeth of the gears mesh with the teeth of the segmental gear 14 to slightly rotate the crank shafts 12 moving the prongs 16 to points within the drum. It follows that as the gears move towards the lower edge of the plate 18, the locking plates are again released, allowing the gears to mesh with the teeth 22, where the gears are rotated moving the crank shaft 12 and extending the loading prongs to a position where they may pick up material.

Brackets 25 are supported adjacent to one end of the frame and support one of the shafts of the endless conveyor 26, curved brackets 27 being supported at the forward end of the frame to support the forward end of the endless conveyor as clearly shown by Figure 1 of the drawings, the brackets 27 being longer than the brackets 25, hold the forward end of the endless conveyor 26 elevated above the fertilizer distributor to which the machine is attached, so that material delivered to the endless conveyor 26 by the delivering drum 9 will be carried forward and delivered into the fertilizer distributor.

At the lower end of the endless conveyor 26 is a beveled pinion 28 adapted to impart rotary movement to the shaft supporting the lower end of the endless conveyor 26, there being provided a shaft 29 provided with a beveled pinion 30 meshing with the pinion 28 to impart rotary movement thereto.

Supported on the inner end of the shaft 29 is a pinion 31 meshing with the gear 32 formed integral with the hub 33 of the wheel 34 which supports the machine.

The numeral 35 indicates a sprocket carried by the wheel 34 over which the chain 36 operates, which chain also operates over the sprocket 37 secured to the shaft 8 so that movement of the wheel 34 and sprocket 36 carried thereby will be imparted to the shaft 8 to rotate the drum.

Curved supporting members 38 are bolted to the side bars of the frame at points substantially intermediate the ends thereof, one bar of each supporting member 38 being formed into a rack 39 to cooperate with the teeth of the pinion 40 associated and carried at the outer ends of the shaft 41 on which the wheels 34 are mounted.

Mounted adjacent to the pinions 40 are gears 42 that cooperate with the worms 43 disposed at one end of the shafts 44 that are mounted in the bearings 45 formed integral with the bearing arm 46. Thus it will be seen that upon rotary movement of the shafts 44, rotary movement will be imparted to the pinions 40 to adjust the frame with respect to the shaft and adapt the machine for use in connection with fertilizer distributors of various sizes.

The shafts 44 are formed with cranks 47 at their free ends so that the worms 43 may be rotated to accomplish the result as described.

Disposed at the forward end of the loading machine, is a suitable coupling indicated at 48 and includes a bar 49 designed to be connected to the rear axle 50 of the fertilizer distributor 51, it being contemplated to hitch the loader to the fertilizer distributor only when the fertilizer distributor is being loaded and when the fertilizer distributor has been loaded, the machine is disconnected therefrom to permit the distributor to be operated to distribute the contents thereof.

An endless conveyor 52 is supported above the distributor 51 and operates in a plane under the upper end of the endless conveyor 26 so that material carried to the upper end of the conveyor 26 will fall onto the conveyor 52, which in turn delivers the material to the bed of the distributor 51.

A chain indicated at 53 imparts rotary movement to the endless conveyor 52 in a well known manner.

It is believed that in view of the foregoing detail description, a further detail description of the operation of the device is unnecessary.

Having thus described the invention, what is claimed as new is:—

1. In a loading machine, supporting wheels, a frame mounted on the supporting wheels, a drum mounted to revolve on the frame, loading prongs supported by the drum, said drum having openings through which the prongs extend, a supporting plate supported at each end of the drum and having a plurality of spaced openings, arms carried by the frame and having bolts adapted to extend through the openings to adjustably support the supporting plates, and means carried by the supporting plates for moving the loading prongs through the drum.

2. In a loading machine, supporting wheels, a frame mounted on the supporting wheels, a rotatable drum supported at the rear of the frame, loading prongs supported within the drum, and adapted to extend through the drum, crank shafts on which the prongs are mounted, said crank shafts extending through the ends of the drum, gears mounted on the ends of the shafts, a supporting plate at each end of the drum, said supporting plates adapted to support the drum, means for adjustably connecting the supporting plates to the frame of the machine, said supporting plates having segmental gears adapted to mesh with the first mentioned gears to rotate the shafts supporting the loading prongs, and means for transmitting movement to the drum.

In testimony that I claim the foregoing as my own, I have hereto affixed by signature.

ARTHUR M. LUSBY.